May 19, 1925.
O. MEIROWSKY
ELECTRICAL CONDENSER
Filed April 29, 1922
1,538,487
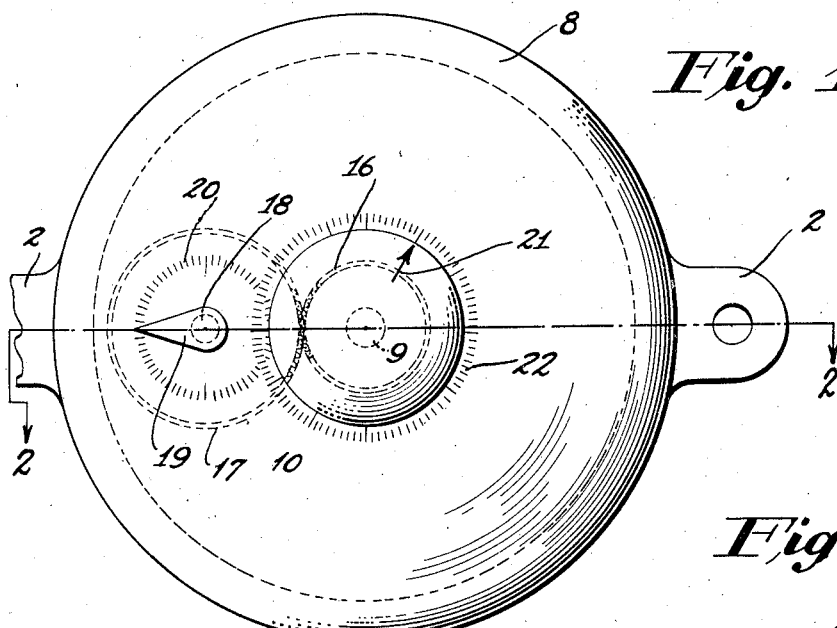
Fig. 1
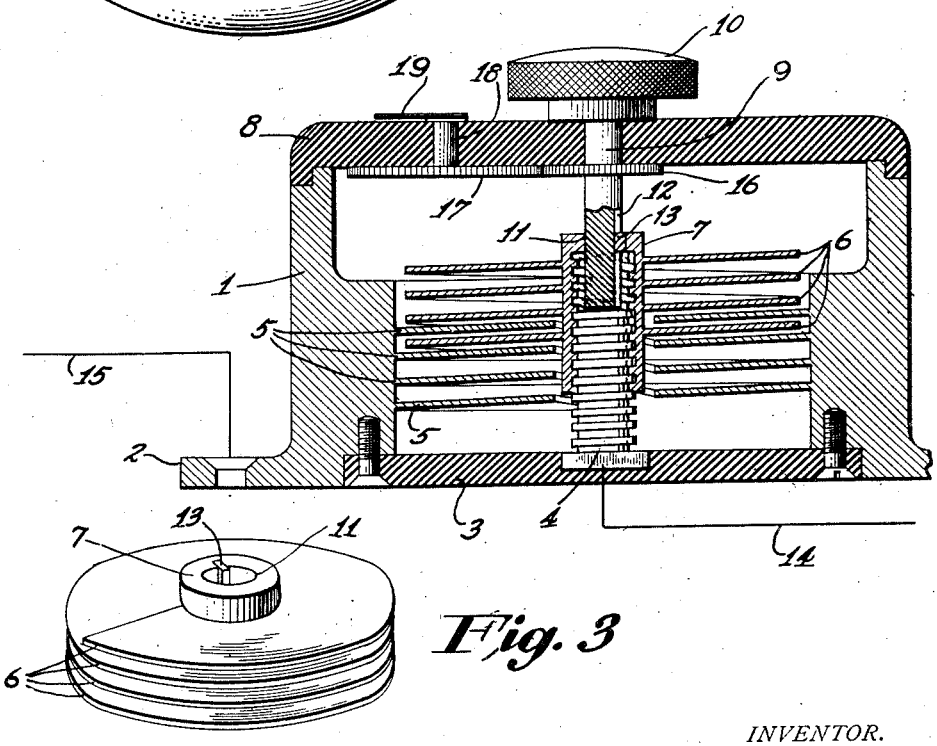
Fig. 2
Fig. 3
INVENTOR.
Oskar Meirowsky
BY Jas. H. Griffin
ATTORNEYS.

Patented May 19, 1925.

1,538,487

UNITED STATES PATENT OFFICE.

OSKAR MEIROWSKY, OF PALISADE, NEW JERSEY.

ELECTRICAL CONDENSER.

Application filed April 29, 1922. Serial No. 557,451.

*To all whom it may concern:*

Be it known that I, OSKAR MEIROWSKY, a citizen of Germany, but having taken out first papers with the intention of becoming a citizen of the United States, residing at Palisade, in the county of Bergen and State of New Jersey, have invented a certain new and useful Electrical Condenser, of which the following is a specification.

This invention is a condenser and, more particularly, an air condenser adapted for general use in radio work.

The object of the invention is to provide a simple and efficient construction, unusually compact, and capable of nice adjustments in the varying of the capacity of the condenser. The invention embodies, generally speaking, an air condenser, the plates of which are relatively movable with respect to one another and are in the form of coaxial, spiral or helical convolutions, one of the plates being fixed and the other movable relative thereto in an axial direction for the purpose of varying the effective cooperating plate surface in order that the capacity of the condenser may be correspondingly varied. In practice, I preferably associate with the movable plate suitable indicating means, whereby the setting of the movable plate with reference to the fixed plate may be accurately determined. By employing the co-operating, spaced, helical plates and moving one with respect to the other, I am enabled to obtain unusual nicety of adjustment of the capacity of the condenser. In fact, the condenser of the present invention is capable of more close, exact adjustment to particular conditions than any prior condenser of which I am aware.

Features of the invention, other than those referred to, will be apparent from the hereinafter detailed description and claims, when read in conjunction with the accompanying drawings.

The accompanying drawings illustrate one practical embodiment of the invention, but the construction therein shown is to be understood as illustrative only and not as describing the limits of the invention.

Figure 1 is a plan view of the condenser embodying the present invention.

Figure 2 is a central section on the line 2—2 of Figure 1; and

Figure 3 is a perspective detail of the movable plate of the condenser removed from the apparatus.

The condenser of the present invention may embody any suitable form of casing which, in practice, may be mounted on any desirable base. For the purpose of illustration, however, I have shown the body of the casing in the form of an annular, metallic ring 1 provided at one end with apertured lugs 2 by means of which said ring may be secured to an instrument board or a suitable base. The lower or inner end of the ring is shown as closed by an insulating plate 3 on the interior of which is fixedly mounted a screw threaded post 4 which extends coaxially of the ring 1, as best shown in Figure 2. On the interior circumference of the ring 1 are formed one or more convolutions 5 of helical form, although a part of one complete convolution may be employed. These convolutions constitute one plate of the condenser which, in the form of the invention shown, is a fixed plate.

The movable plate of the condenser is shown in detail in Figure 3 and consists of a plurality of helical metallic convolutions 6 formed integral with or rigidly mounted on the thimble or carrier 7, the interior of which is threaded to adapt said carrier to be screwed upon the threaded post 4.

The top or forward end of the ring 1 is closed by a suitable cover plate 8 shown as of insulating material, and mounted centrally of this cover plate is an adjusting spindle 9 which may be manually rotated by means of a knob 10 fixed to the outer end of the spindle. The spindle extends well into the interior of the ring 1 and through an opening 11 in the top of the carrier 7. It will be noted, however, in Figures 2 and 3 that a key-way 12 is cut in the spindle 9 while the carrier 7 is provided with a key 13 adapted to slide in said key-way. The construction is such that when the knob 10 is rotated the spindle 9 will effect rotation of the carrier 7 for the purpose of screwing said carrier 7 to a greater or lesser extent upon the post 4. In practice, the pitch of the helical convolutions 6 is made the same as the pitch of the helical convolutions 5 and the pitch of the threads of the post 4 is the same so that as the carrier 7 is screwed onto the post the convolutions 6 of the movable plate will enter or become interspaced between the convolutions of the fixed plate. The respective plates are, however, made of such thickness that, when the movable plate is brought into interfitting relation with the fixed plate, the plates will not contact with one another at any point but will leave an air space which constitutes the dielectric of the condenser. The condenser may conveniently be included in an electric circuit by electrically connecting one of the circuit leads 14 to the post 4 and the other circuit lead 15 to the ring 1.

I have found that in a condenser constructed as described, very nice adjustments may be obtained in varying the capacity of the condenser through the raising or lowering of the carrier 7 on the post 4 for the purpose of varying the cooperating effective area of the two plates. The casing is made sufficiently deep to permit the movable plate to be fully withdrawn from the fixed plate during which the spindle 9 remains fixed as regards longitudinal movement while the carrier is shifted longitudinally on said spindle but locked for rotation therewith by the key-way 12 and key 13.

In order that the operator may know at all times the exact position of the movable plate with reference to the fixed plate, the spindle 9 has affixed thereto a carrier 16 which meshes with the carrier 17. Both these carriers are positioned within the casing but the spindle 18 of the carrier 17 extends through the cover 8 of the casing and carries a pointer or indicator 19 adapted to rotate over a fixed or graduated dial 20 on the top thereof. Similarly, the knob 10 is provided with an indicating designation or arrow 21 adapted to cooperate with the scale 22 on the cover, as clearly shown in Figure 1. The scale 22 is adapted to show angular degrees of rotation of the movable plate while the carriers 16 and 17 are so proportioned that the pointer 19 will show complete and fractional revolutions of such plate. By this arrangement the operator is enabled to obtain an exact reading of the adjustments of the movable plate. It will, of course, be understood that the reading may be effected through other indicating mechanism than that shown, the form of the drawings being advanced for the purpose of illustration, only. The condenser of the present invention is unusually compact and provides a great range of adjustment, between the limits of which most exact and minute adjustments may be obtained.

In the accompanying drawings, I have illustrated the preferred practical form of the invention. It will be understood, however, that structural details may be varied, as by the substitution of equivalents, without departing from the spirit of this invention, the scope of which is commensurate with the appended claims. In the appended claims, I have referred to the plates as helical. I wish it understood that this term is to be construed as a helix which advances longitudinally of its axis and not as a spiral lying in a common plane. It is essential that the helix advance longitudinally of its axis after the manner of a screw thread, otherwise one of the plates could not be rotated relative to the other to obtain the nice adjustment desired, but would, in contradistinction, be inoperative when so rotated. The accompanying drawings show the helix advancing in the manner described and this is the construction to be placed on the appended claims.

Having thus fully described the invention, what I claim as new and desire to secure by Letters Patent, is:

1. A variable condenser embodying a plurality of cooperating, coaxial, helical plates, at least one of which is relatively rotatable for the purpose of varying the effective cooperating areas of said plates.

2. A variable condenser embodying a fixed helical plate, a coaxial rotatable, helical plate, and means for rotating the rotatable helical plate and simultaneously moving it longitudinally of the common axis of both plates for the purpose of varying the area of the movable plate which interfits the fixed plate, whereby the effective, cooperating areas of said plates and consequent capacity of the condenser may be varied.

3. A condenser embodying a plurality of cooperating helical plates having the same axial pitch, and means for simultaneously effecting both relative axial movement and rotation between the respective plates for the purpose of varying the capacity of the condenser.

4. A condenser embodying a fixed helical plate, a fixed threaded member positioned coaxial of said plate, a rotatable helical plate having threaded engagement with the threaded member, and means for rotating the rotatable plate on the threaded member to vary the capacity of the condenser.

5. A condenser embodying a fixed helical plate, a fixed threaded member positioned coaxial of said plate, a movable helical plate having threaded engagement with the threaded member, means for rotating the movable plate on the threaded member to vary the capacity of the condenser, and indicating means operable with the movable plate to show the position thereof.

6. A condenser embodying a fixed helical plate, a threaded post extending coaxially of the fixed plate and fixed against movement, a carrier having threaded connection with the post, a movable plate rigid with the carrier and embodying helical convolutions having the same pitch as the convolutions of the fixed plate, and an operating knob provided with a rotatable spindle secured against longitudinal movement, but locked against relative rotation to the carrier, whereby the knob may be rotated to rotate the carrier on the post for the purpose of causing a greater or lesser portion of the movable plate to interfit the convolutions of the fixed.

7. A condenser embodying a fixed helical plate, a threaded post extending coaxially of the fixed plate and fixed against movement, a carrier having threaded connection with the post, a movable plate rigid with the carrier and embodying helical convolutions having the same pitch as the convolutions of the fixed plate, and an operating knob provided with a rotatable spindle secured against longitudinal movement, but locked against relative rotation to the carrier, whereby the knob may be rotated to rotate the carrier on the post for the purpose of causing a greater or lesser portion of the movable plate to interfit the convolutions of the fixed, in combination with means for indicating the operations of the movable plate.

8. A condenser embodying a fixed helical plate, a threaded post extending coaxially of the fixed plate and fixed against movement, a carrier having threaded connection with the post, a movable plate rigid with the carrier and embodying helical convolutions having the same pitch as the convolutions of the fixed plate, and an operating knob provided with a rotatable spindle secured against longitudinal movement, but locked against relative rotation to the carrier, whereby the knob may be rotated to rotate the carrier on the post for the purpose of causing a greater or lesser portion of the movable plate to interfit the convolutions of the fixed, the carrier being adapted for sliding movement relative to the spindle, whereby the axial movement of the carrier is not imparted to the spindle.

In testimony whereof I have signed the foregoing specification.

OSKAR MEIROWSKY.